United States Patent [19]
Eisen et al.

[11] Patent Number: 5,060,249
[45] Date of Patent: Oct. 22, 1991

[54] METHOD AND APPARATUS FOR THE DETECTION AND IMAGING OF HEAVY METALS

[75] Inventors: Yosef Eisen, Rishon Lezion; Drora Kedem, Emanuel Yellin, both of Rehovot, all of Israel

[73] Assignee: The State of Israel, Atomic Energy Commission, Soreq Nuclear Research Center, Israel

[21] Appl. No.: 394,016

[22] Filed: Aug. 15, 1989

[30] Foreign Application Priority Data

Aug. 26, 1988 [IL] Israel .......................................... 87570

[51] Int. Cl.⁵ ............................................. G01N 23/04
[52] U.S. Cl. ........................................ 378/57; 378/53; 378/158
[58] Field of Search ................... 378/53, 57, 56, 62, 378/157, 158, 159

[56] References Cited

U.S. PATENT DOCUMENTS

| | | | |
|---|---|---|---|
| 3,848,130 | 11/1974 | Macovski | 378/100 |
| 3,884,816 | 5/1975 | Takahashi | 378/57 |
| 4,759,047 | 7/1988 | Donges et al. | 378/57 |

*Primary Examiner*—Edward P. Westin
*Assistant Examiner*—David P. Porta
*Attorney, Agent, or Firm*—Steinberg & Raskin

[57] ABSTRACT

Method and apparatus for the fast inspection of objects for the detection of elementary or compounded metals of the kind that are capable of producing with impinging X-radiation within the range of 60–160 KeV a detectable photoelectric interaction. A 110–160 KeV X-ray source is used in association with collimating and filtering apparatus, capable of generating a collimated X-ray beam consisting of repeating cycles comprising each one energy bin having a flux centred around the K-edge energy of the target metal and, if desired, comprising additionl energy bins. There is also provided a linear array of solid state, spectroscopy grade detectors. Objects to be searched for these metals are scanned by moving them across the beam at a location intermediary between the X-ray source and the detector, at a speed so selected that during each of the predetermined pixels the full energy range of the said cycle impinges a full cross-section of an inspected object without any mutual dislocation between said X-ray source and linear array of solid state, spectroscopy grade detectors. For each pixel the intensity of transmitted radiation of selected bands is recorded and the ratios of the transmitted radiation in these bands is determined. The results are processed to an image of any detected article.

16 Claims, 5 Drawing Sheets

METHOD AND APPARATUS FOR THE DETECTION AND IMAGING OF HEAVY METALS

FIELD OF THE INVENTION

The present invention relates to a fast inspection system for automatic detection and imaging of small and concealed amounts of elementary and compounded heavy metals such as lead, gold, uranium and the like. The invention is applicable for detecting in luggage, parcels, letters and the like, smuggled elemental and compounded precious metals such as gold and platinum, strategic metals such as uranium, thorium and plutonium, as well as explosive devices with lead-based or mercury-based detonators. In the following description the background of the invention will be discussed in connection with the detection of lead-based and mercury-based detonators such as lead azide or lead stiphnate, it being understood that the invention is not confined thereto.

BACKGROUND OF THE INVENTION

The following is a list of prior art publications believed to be pertinent:
1. "Proceedings of the new concepts symposium and workshop on detection and identification of explosives, Reston, Virginia", U.S. Department of Commerce, National Technical Information Service (Oct. 1978), and references therein;
2. U.S. Pat. No. 3,832,545, J.R. Hansen, W.C. Divens, M.J. Hurwitz and R.J. Schneeberger, Westinghouse Corporation;
3. "An evaluation of X-ray fluorescence as a means of explosives detection", R.I. Miller, C.L. Abbat, S.A. Daavey and P.T. Smith, SAI, Sunnyvale, Ca 1977. The work was supported by the FAA under contract DOT-FA77WA-3963;
4. F.S. Goulding, Muc. Instr. and Meth. 142 1977) 213;
5. Differential X-ray method and apparatus, F. Keliz and C.A. Mistretta, Wisconsin Alumni Research Foundation, U.S. Pat. No. 3,974,386;
6. Determination of uranium content in material quantitative analysis, R.C. Smith, Westinghouse Electric Corp. U.S. Pat. No. 4,158,769 (1979).

A great need exists for the fast screening of luggage, parcels, letters and the like for the purpose of detecting any concealed explosive devices (Ref.1). Explosive devices comprise an explosive material and a detonator and the former are often in the form of sheets such as those commercially known by the name Deta (Trade Mark, Du Pont) which are difficult to detect by any known fast scanning system (Ref.2). It has therefore been realised that a reliable method for the detection of explosive devices such as booby-traps or time bombs, that functions regardless of the nature and shape of the explosive material, could be based on detection of their lead-based or mercury-based detonators. Due to their small size, detonators are easily concealed among other objects. Consequently they cannot generally be perceived visually, e.g. in images of the interior of a piece of luggage produced by a conventional X-ray apparatus such as used for the inspection of luggage at airports. It has therefore been proposed (Ref. 3) to detect lead-based or mercury-based detonators by means of the X-ray fluorescent technique (Ref.4). This method, however, was found to be ineffective in luggage handling operations because of its low sensitivity, the high probability of its producing false alarm and its being intrinsically incapable of imaging the screened object.

There is known in the art the so-called K-edge technique for the detection of elements by means of X-rays. Thus for example, U.S. Pat. No. 3,974,386 (Ref.5) discloses the improvement of the visibility of a contrast medium, such as iodine or xenon by making use of their K-edge absorption. In accordance with that method the patient with the particular absorption medium under consideration in some of his internal parts is kept still and serves as the substrate that produces a K-edge discontinuity of the transmitted radiation. The X-ray images of the patient resulting from the X-ray transmittance, are directly intercepted by an intensification screen adapted to convert an invisible X-ray image into a visible image. Several different images are produced with different X-ray intensities only one of which corresponds to the K-edge energy and the resulting visible images produced by the intensification screen are processed by a complicated substraction and integration process by which a visible image with the desired contrast intensification is obtained. Thus, essentially this is a conventional X-raying method with an attachment for improving the visibility of contrast media.

Another detection method based on the K-edge technique is disclosed in U.S. Pat. No. 4,158,769 (Ref.6). That method serves for the determination of the uranium content in a solution obtained by extraction of a uranium ore and use is made of the intrinsic $\gamma$-radiation of thorium, a uranium daughter that invariably accompanies uranium. The inspected solution is flown past a window that is transparent to $\gamma$-radiation and on the other side of that window there are located immobile $\gamma$-radiation filtering means and the radiation emerging from such filtering means is evaluated by suitable radiometric means. The filters in association with the radiometric means are designed to respond to absorption at the K-edge energy band which produces a K-edge discontinuity and in this way it is possible to obtain an indication of the uranium content in the inspected solution. The $\gamma$-radiation here is intrinsic and originates from within the observed object. Put in other words, the quantity of a soughtafter object is here determined on the basis of an intrinsic property thereof.

There is not known any method or apparatus for the detection of heavy elements or detonators by the K-edge technique in which the presence or absence of a given substrate even in a complete matrix is determined on the basis of a K-edge discontinuity of the transmittance of impinging extrogeneous X-radiation in combination with a detector system of high resolving power.

SUMMARY OF THE INVENTION

In the following description and claims the term "pixel" will be used to signify a given time unit or pathlength commensurate with the smallest size of the target article. In connection with detonators a pathlength of about 1.5 mm was found practical.

In accordance with the present invention there is provided a method of detecting in sequentially inspected objects a target article made of or containing an elemental or compounded target metal of the kind capable of producing with impinging X-radiation within the range of 60–160 KeV a detectable photoelectric interaction, characterized by providing a radiation generating assembly comprising a 110–160 KV X-ray source in association with collimating and filtering means, generating with such assembly a collimated X-ray beam consisting of repeating cycles comprising each one energy bin having a flux centered around the K-edge energy of the target metal and, if desired, comprising additional energy bins (hereinafter "the said cycle(s)"); placing at a distance from the X-ray source and in a region flushed by said collimated X-ray beam a linear array of solid state, spectroscopy grade detectors in association wit signal counting, processing and imaging means; providing object carrier means intermediary between said X-ray source and linear array of solid state, spectroscopy grade detectors; placing objects on said carrier means; arranging for said X-ray source and collimated X-ray beam on the one hand and said support means on the other hand to move relative to each other at a speed so selected that during each one of predetermined pixels the full energy range of the said cycle impinges a full cross-section of an inspected object without any mutual dislocation between said X-ray source and linear array of solid state, spectroscopy grade detectors; recording for each pixel the intensity of transmitted radiation of selected bands; determining for each pixel the ratios between the transmitted radiation in said selected energy bands; and processing the resulting data to produce an image of any detected target article.

Spectroscopy grade solid state detectors are known, a typical example being CdTe detectors.

By moving the objects relative to the X-ray beam in the manner specified, all inspected objects are successively scanned. Such relative movement may be achieved either by making the object carrier means movable, e.g. by making them in the form of a conveyor belt, or by moving the X-ray source and the detector array synchronically with respect to immobile inspected objects.

Preferably all detectors of an array are at the same distance from the X-ray source by being located on a circular arc whose radial center is the X-ray source.

The invention also provides an apparatus for performing the above method, characterized by a radiation generating assembly comprising a 60–160 KeV X-ray source in association with collimating and filtering mean capable of generating a collimated X-ray beam consisting of repeating cycles comprising each one energy bin having a flux control around the K-edge energy of the target metal and, if desired, additional energy bins; a linear array of solid state, spectroscopy grade detectors in association with signal counting, processing and imaging means, which detectors are spaced from said radiation generating assembly; object carrier means intermediary said radiation generating means and said array of solid state, spectroscopy grade detectors; and means for causing the radiation generating means and array of solid state detectors on the one hand and said object carrier means on the other hand to move relative to each other at a speed so selected that during each of predetermined pixels the full energy band of the said cycle impinges a full cross-section of said object carrier means without any mutual dislocation between the radiation generating means and solid state detector array.

The processing and imaging means operate on the basis of an algorithm which takes into account various specificities of the target article. For example, in case the target article is a lead-based detonator the algorithm will take into account the structure of the detonator and its lead content and be designed to discriminate a detonator from other lead containing articles such as, for example, articles with lead solder material. Such algorithms reduce the false-alarm rate to a considerable extent.

It has been found in accordance with the present invention that an imaging system based on the ratios between the transmission rates of different energy bands in combination with the total transmission in each pixel, enables to produce a reliable image of the object and also to discriminate between articles of elements with low atomic numbers such as plastics, and articles of elements with high atomic numbers such as iron, gold, lead, uranium, thorium etc.

Essentially, the method according to the invention may be performed by two different modes. By one mode the filtering means of said radiation generating assembly are designed to generate successively several energy bins during each of the said cycles which are centered around the K-edge energy of the target metal. Thus, in this mode the energy bins constituting a cycle emerge sequentially from the radiation generating assembly and the radiation flux attenuations are also recorded sequentially.

By an alternative mode the filtering means of the radiation generating assembly are designed to generate during each of the said cycles one single, preferably narrow energy bin only, having its peak substantially at the K-edge energy of the target metal. In such a mode the detectors and associated signal counting means are so arranged as to be capable of differentiating between simultaneous radiation of different attenuations within predetermined energy ranges (so-called "windows") of said single bin.

In both modes the ratio of the transmission between the various energy groups in each pixel supply the desired identification of the target metal.

It is easily understood from the foregoing that the invention is significantly distinguished from the prior art. Thus the invention provides for the first time a unique method and system for the detection of concealed detonators in luggage, parcels, letters and the like, having a high penetration and detection probability, a low false alarm rate and producing excellent images of any target articles in the luggage.

By its unique features the invention satisfies for the first time a long felt need.

DESCRIPTION OF THE DRAWINGS

For better understanding, the invention will now be described with reference to the annexed drawings in which.

DESCRIPTION OF SPECIFIC EMBODIMENTS

Figure 1:
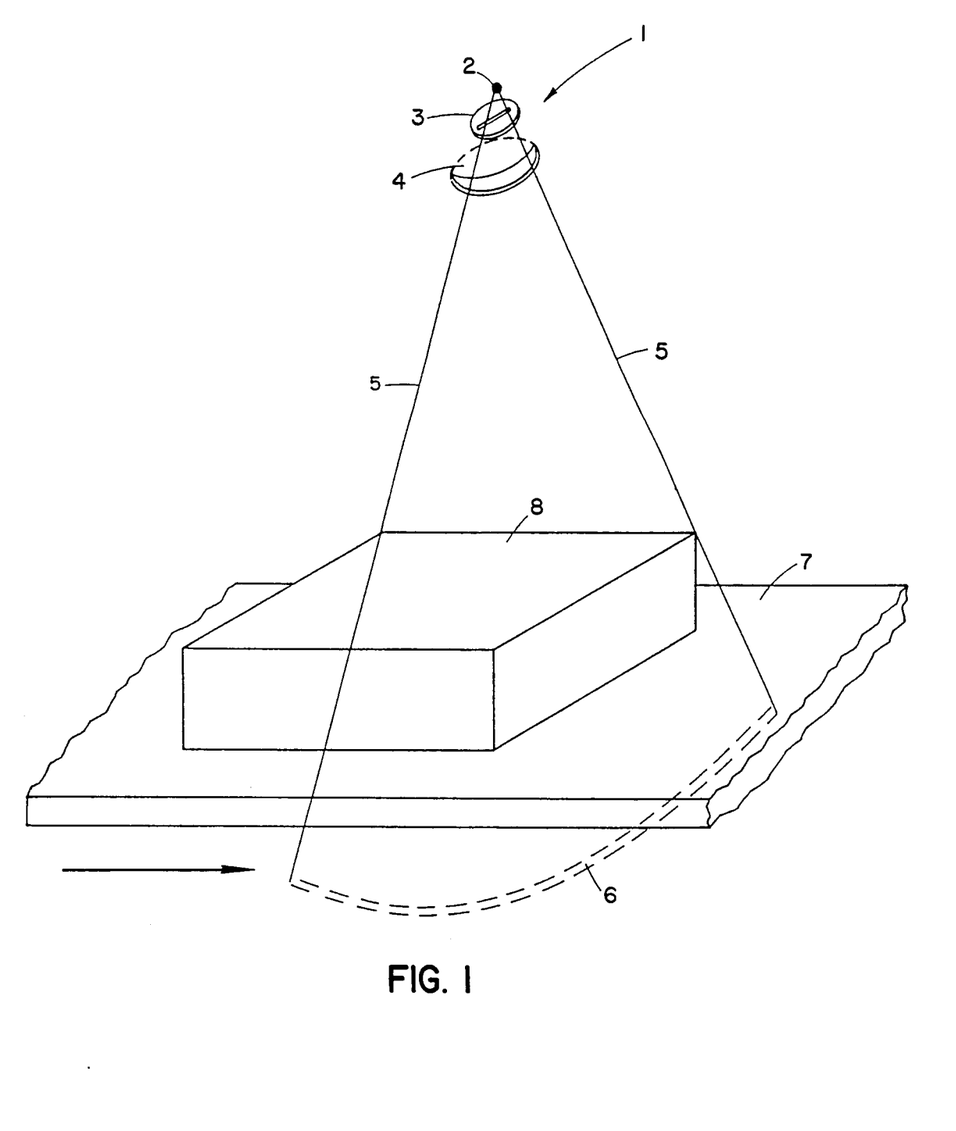
FIG. 1 is a schematic illustration of a detection assembly according to the invention.

The device according to the invention schematically shown in FIG. 1 is assumed to serve for detection of lead-based detonators. It comprises a radiation generating assembly 1 including a low ripple, constant potential X-ray radiation source 2 of 125 KV with a collimator 3 and a three component revolving filtering aggregate 4 designed to transmit repeating radiation cycles each holding a succession of three narrow energy bins centered around 75, 85 and 95 KeV. The collimated beam generated by assembly 1 is symbolized in FIG. 1 by the perimeter lines 5.

A linear, solid state, spectroscopy grade detector array 6 is located along a circular arc whose radial center is the radiation source 2 and in this way all individual detectors of the array are at the same distance from source 2.

Intermediary between assembly 1 and array 6 there is located a conveyor belt 7 adapted to carry inspected objects 8 across the beam 5 whereby each object is scanned. As is readily seen from FIG. 1, the bow of the arcuate line of detector array 6 is longer than the cross-section of an object 8 and this ensures that the entire cross-section of the object is successively exposed.

In operation, conveyor belt 7 is caused to travel across beam 5, say from left to right, whereby each object 8 thereon is scanned and the intensities of the transmitted radiation at various energy groups are recorded, processed in the manner specified and imaged. The travel speed of conveyor belt 7 is so selected that during each of predetermined pixels a full cross-section of an object 8 is exposed to at least one cycle of the said three energy bins.

Figure 2:
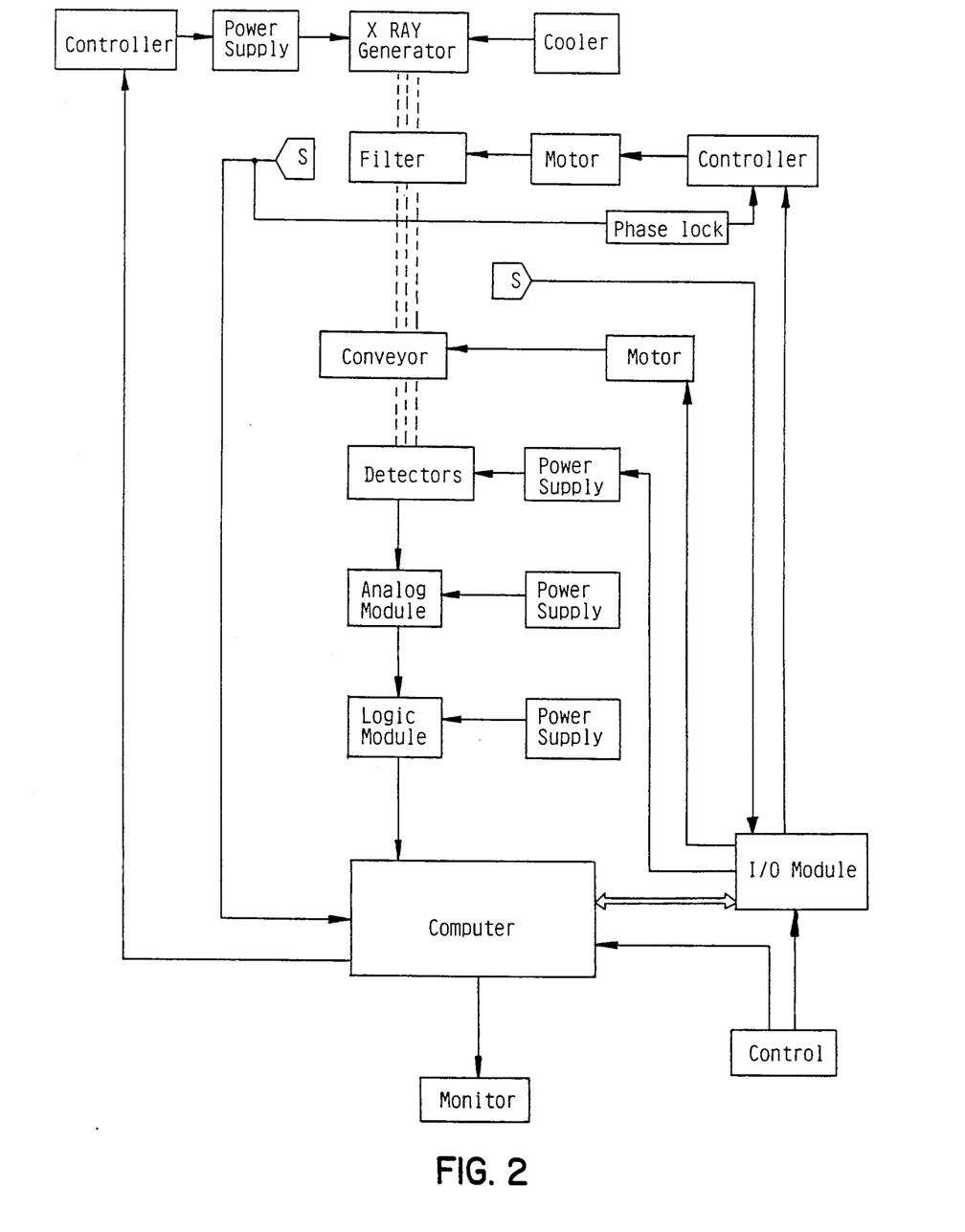
FIG. 2 is a block diagram of the detection assembly of FIG. 1.

The operation of the above assembly is better understood by reference to the block diagram of FIG. 2. In this FIG. each block includes a functional description and there is no need for any further explanation.

Figure 3:
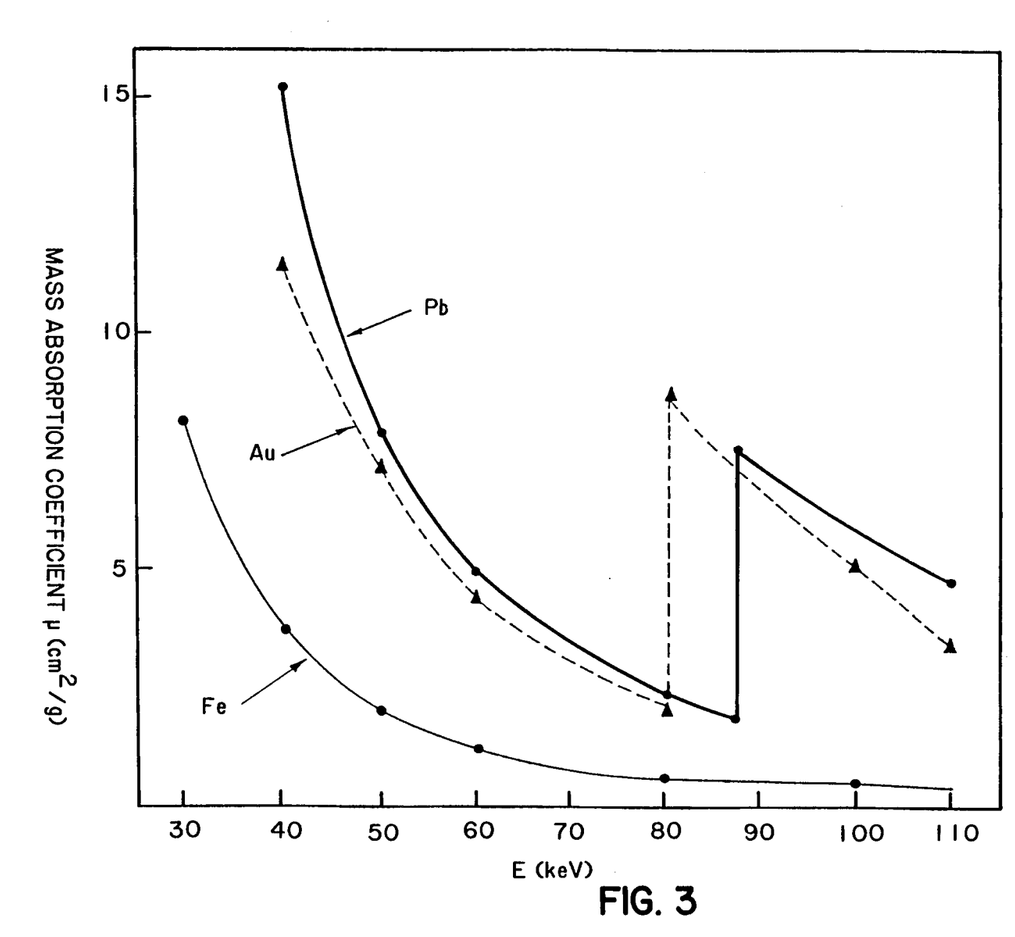
FIG. 3 shows absorption coefficient versus energy curves in the energy region of 25 to 110 KeV for the metals Fe, Au and Pb.
Figure 4A:
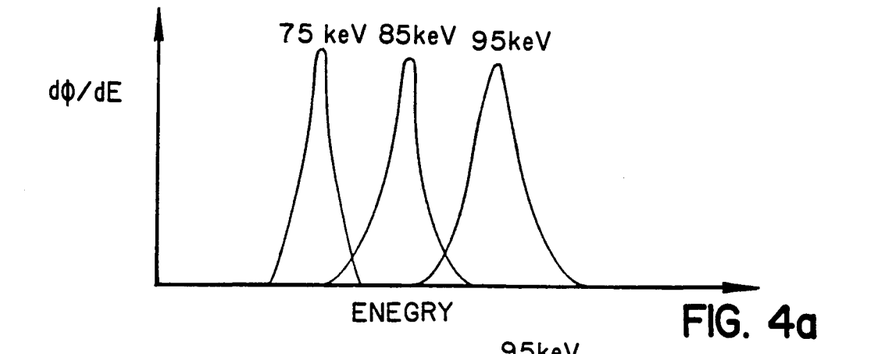
FIGS. 4a–d show graphical representations of flux $d\phi/dE$ versus energy, where $\phi$ is the flux and E the energy, demonstrating the relative X-ray absorptions by Fe, Pb and Au in three energy bins, having their peaks at 75 KeV, 85 KeV and 95 KeV.
Figure 4B:
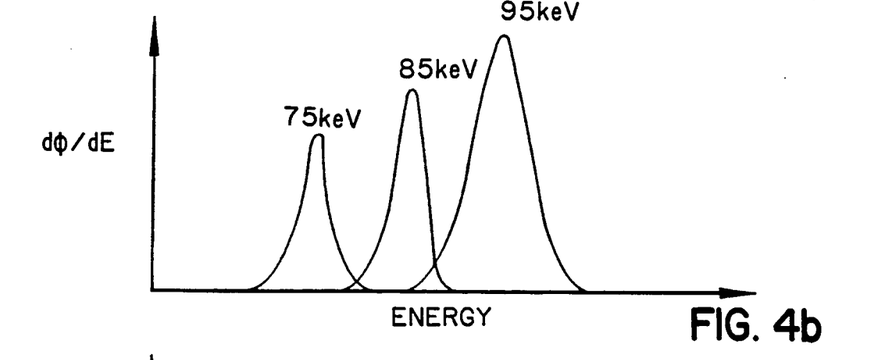
Figure 4C:
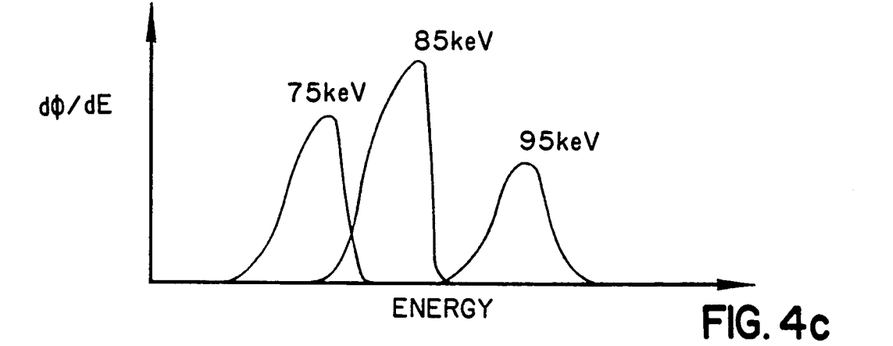
Figure 4D:
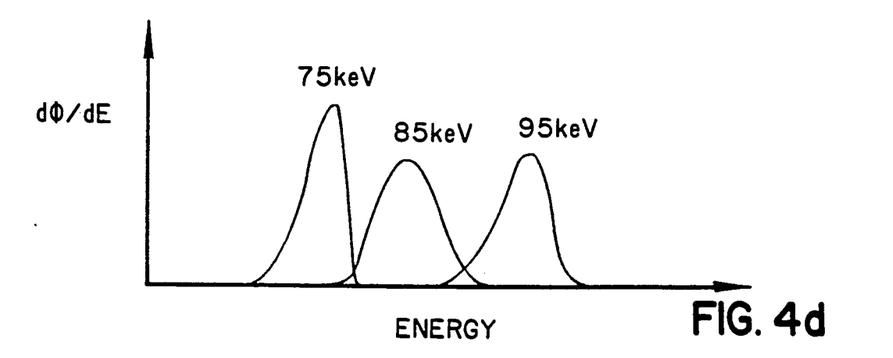
Figure 5A:
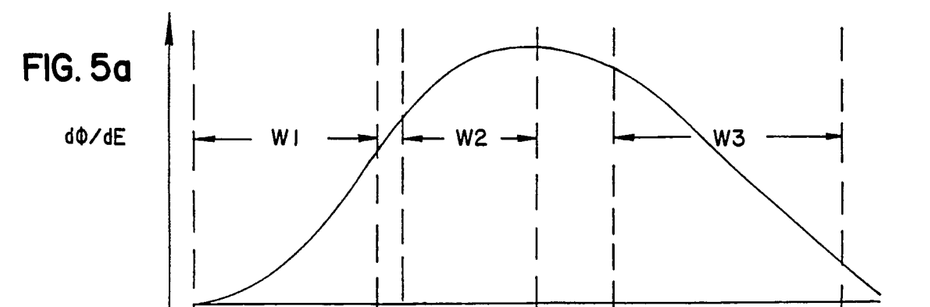
FIGS. 5a–d show graphical representations of $d\phi/dE$ versus energy demonstrating X-ray absorptions by Fe, Pb and Au in one single energy bin having its peak at 88 KeV which is the K-edge energy of Pb, within three selected "windows".
Figure 5B:
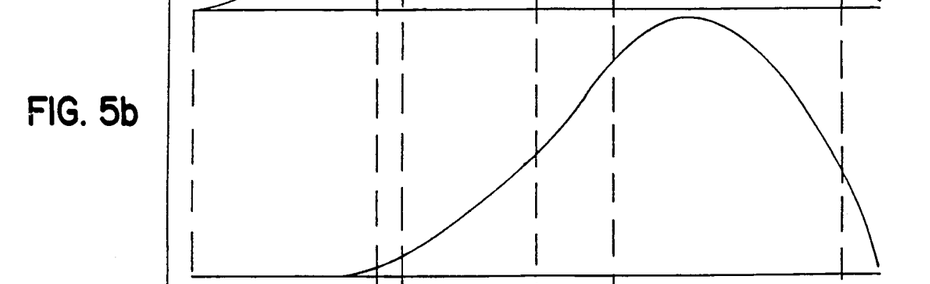
Figure 5C:
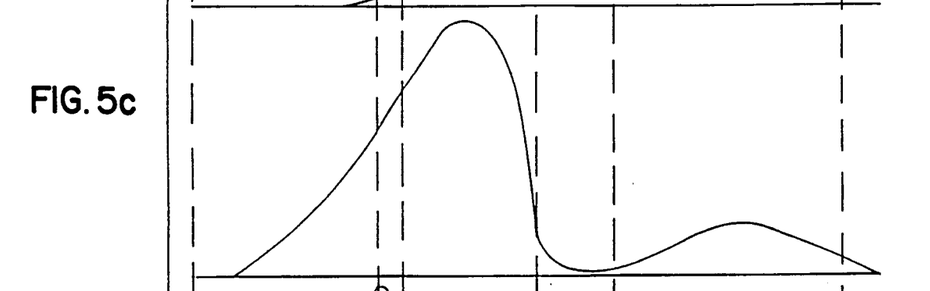
Figure 5D:
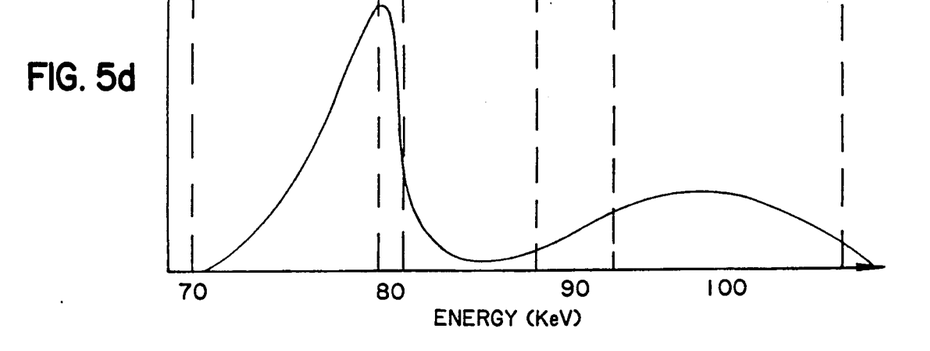

For better understanding of the recording process, reference will now be made to FIGS. 3 and 4. In FIG. 3 the mass absorption coefficient $\mu$ of X-ray radiation is plotted against the radiation energy for the metals Fe, Au and Pb and in FIG. 4 $d\phi/dE$ is plotted against energy without any attenuation (FIG. 4a) and with attenuation by iron, lead and gold (FIGS. 4b, 4c and 4d, respectively). In FIG. 3, the energy plotting begins with about 25 KeV and it is seen that for iron the absorption decreases continuously with energy which is in keeping with the known fact that the K-edge energy of iron is around 7 KeV. For gold there is also a gradual decrease of the absorption with energy up to an energy of 80.7 KeV which is the K-edge energy of gold. At that energy level there is a sharp absorption increase, followed again by a gradual decrease. The behaviour of lead is similar but the K-edge absorption energy here lies at 88 KeV.

Airline passengers' luggage may routinely include various articles of gold and iron as well as light materials, and consequently the luggage inspection in accordance with the invention aiming at detecting lead-based detonators must be so designed and performed as to distinguish between the detonators and other articles, including such that are of or contain iron and gold. Accordingly, if the multi-energy bin mode according to the invention is employed for the purpose, three narrow energy bins centered around 75, 85 and 95 KeV are conveniently selected. In operation each pixel includes separately the information from each of the three energy bins, which is generated sequentially. Where none of the elements Fe, Pb and Au is present and the articles within an inspected object are made of elements having a low atomic numbers such as plastics, clothes and the like the interaction is dominated by the Compton effect. The absorption cross-section varies slowly as a function of the incident photon energy and the distinctions between the flux transmitted across the inspected object in the three energy bins is relatively small, the attenuation being the largest for the lowest energy, i.e. in the 75 KeV bin.

When the target article is made from a metal with a higher atomic number such as iron, interaction is no more dominated by the Compton effect and photoelectric interaction plays an increasingly important role. The absorption cross-section now varies more significantly and faster as a function of the energy (see FIG. 3). Also in the case of iron the largest attenuation occurs with the lowest energy, i.e. in the 75 KeV bin and the result is represented in FIG. 4b. It is seen therefrom that the high energy bin of 95 KeV is affected only slightly, the median energy bin of 85 KeV is affected more and the low energy bin of 75 KeV is significantly attenuated.

Where the target article is made of lead or a lead compound, the interaction with the incident X-radiation is dominated by the photoelectric effect. The absorption cross-section has a discontinuity at 88 KeV. In the region of 60–88 KeV, the absorption cross-section is lower than in the region 88–110 KeV (see FIG. 3). Therefore the low and medium energy bins of 75 and 85 KeV are less attenuated than the highest energy bin of 95 KeV (see FIG. 4c). It is further seen there that the lowest energy bin of 75 KeV is attenuated more than the medium energy bin. Therefore, when a lead-based detonator is located on some background material, there is a sudden increase in the ratio between the transmitted flux in the medium energy bin to that in the high energy bin, followed by a decrease in the total flux being the sum total of photons transmitted through the inspected object in the three energy groups.

When the target article is made of gold the absorption cross-section has a discontinuity at an energy of 80.7 KeV (see FIG. 3). In the region 60–80.7 KeV, the absorption cross-section is lower than in the region of 80.7–88 KeV and accordingly the lowest energy bin is less attenuated than the medium energy bin and the medium energy bin is more attenuated than the third energy bin (see FIG. 4d). Thus, when the beam crosses a layer of gold, there is a sudden increase in the ratio between the flux in the lowest energy bin to the flux in the medium energy bin and also a sudden increase in the ratio between the flux in the medium energy bin and the flux in the highest energy bin. These increases are followed by a decrease of the total flux as defined above.

The assembly of FIG. 1 is associated with a signal counting device whose output is fed into an analog and logic electronic circuitry in combination with a minicomputer as known per se, as shown in FIG. 2. This computerized circuitry processes the readings of the transmitted radiation to generate data of flux ratios and of total flux decrease and these data are used for a mathematical two-dimensional differentiation to discriminate between lead-based detonators and materials. In addition, information on size and amount of absorption is obtainable to differentiate between lead-based detonators and other lead-containing articles. The output of such data processing is fed into an imaging device as known per se to produce an image of the object. If a detonator is found, an indicator is overlaid on the image and both the image and overlay are given in real time. Where the image is that of a detonator, conveyor belt 7 is arrested and the inspected object 8 concerned is removed for further handling.

Where the inspected object contains at the same time articles of different target metals, say of iron, gold and lead, the ratios and total number of interactions for each pixel provide a rough estimation of the type of material in the article. The system is thus capable of supplying an image of different metal articles in the inspected object and roughly differentiates between them according to their atomic number.

Instead of using several energy bins as described with reference to FIG. 4, it is also possible to use one single energy bin which in the case of the target metal being lead, is centred around 88 KeV which is the K-edge energy of lead. Such a mode is represented in FIG. 5 which includes four different graphical representations of $d\phi/dE$ versus energy. In FIG. 5 the abscissa with the energy is drawn to a larger scale than in FIG. 4 while the ordinate with the flux is drawn to the same scale. Therefore the energy bin shown in FIG. 5, although looking flat is actually quite narrow. In part a of FIG. 5 the unattenuated energy bin is shown and it is seen that the maximum flux is at 88 KeV. Part b of FIG. 5 shows the attenuation for iron and it is seen that within the selected band or "window" marked W1 the incident X-ray beam is nearly totally absorbed. Within another "window" marked W2 there is a relative increase of the flux of the transmitted radiation and a further relative increase occurs in a third "window" marked W3.

Part c of FIG. 5 shows the attenuation for lead and it is seen that the maximum of the transmitted flux is shifted to the W2 "window" while within "windows" W3 there is a near total attenuation of the flux.

In the case of gold (FIG. 5d) the maximum of the transmitted flux is shifted to the W1 "window" and a large attenuation occurs in the W2 and W3 "windows".

It is thus seen that in the case of a single, relatively narrow X-ray bin centred around 88 KeV the maximum of the transmitted flux shifts to the high energy side in the case of iron, slightly to the low energy side in the case of lead and more to the low energy side in the case of gold. The transmission ratios in the "windows" W1, W2 and W3 are characteristic of the target metal and thus serve for identification in combination with the total flux data, similar as before.

In this embodiment of the invention the "windows" W1, W2 and W3 were selected at will so as to meet the specific requirements of differentiating between different metals. The spectroscopy grade detectors and the associated signal counting means are arranged in a pattern that reflects such a selection, in a manner known per se.

While in the foregoing specification description of the invention has been specifically described with reference to leadbased detonators, mercury-based detonators as well as other target articles may be detected in a fully analogous manner.

It should further be noted that instead of moving the inspected object continuously or alternatively moving continuously and synchronously the radiation generating assembly and the detector array, such motions may be intermittent.

We claim:

1. An automatic method of detaching in sequentially inspected objects a target article made of or containing an elemental or compounded target metal of the kind capable of producing with impinging X-ray radiation within the range of 60–160 KeV a detachable photoelectric interaction, said method comprising the steps of providing a radiation generating assembly comprising a 110–160 KeV X-ray source in association with collimating and filtering means, which filtering means are designed to successively generate several energy bins during each one of repeating cycles;

generating with such assembly a collimated X-ray beam consisting of repeating cycles each comprising several energy bins centered around the K-energy of said target metal;

placing at a distance from said radiation generating assembly and in the region flushed by said collimated X-ray beam a linear array of solid state, spectroscopy grade detectors in association with signal counting, processing and imaging means;

providing object carrier means intermediary between said radiation generating assembly and linear array of solid state, spectroscopy grade detectors;

placing objects on said object carrier means;

arranging for said energy generating assembly on the one hand and said object carrier means on the other hand to be displaced relative to each other at a relative velocity so adjusted that during each one of predetermined pixels commensurate with the expected smallest size of said target article the full energy range of one of said repeating cycles impinges a full cross-section of an inspected object without any mutual dislocation of said radiation generating assembly and linear array of solid state detectors; whereby successive electrical signals are produced in said linear array of spectroscopy grade detectors;

using said electrical signals for recording for each pixel the intensity of transmitted radiation of selected energy bands;

determining for each pixel the ratios between the transmitted radiation in said selected energy bands; and processing the resulting data to produce an image of any detected target article.

2. The method of claim 1, wherein the relative displacement between the radiation generating assembly and the object carrier means is brought about by moving the object carrier means.

3. The method of claim 1, wherein the relative displacement between the radiation generating assembly and the object carrier means is brought about by moving synchronically the radiation generating assembly and linear array of solid stat detectors.

4. The method of claim 1, wherein the relative displacement between the object carrier means and the radiation generating assembly is continuous.

5. The method of claim 1, wherein the relative displacement between the object carrier means and the radiation generating assembly is intermittent.

6. An automatic method of detecting in sequentially inspected objects a target article made of or containing an elemental or compounded target metal of the kind capable of producing with impinging X-radiation within the range of 60–160 KeV a detectable photoelectric interaction, said method comprising the steps of providing a radiation generating assembly comprising a 110–160 KeV X-ray source in association with collimating and filtering means, which filtering means are designed to generate during each of said cycles one single, energy bin;

generating with such assembly a collimated X-ray beam consisting of repeating cycles each comprising one single energy bin having a flux centered around the K-edge energy of said target metal;

placing at a distance from the radiation generating assembly and in a region flushed by said collimated X-ray beam a linear array of solid state, spectroscopy grade detector in association with signal counting, processing and imaging means, which detectors are arranged in such a way as to differentiate between simultaneous different radiation flux attenuations within predetermined energy ranges of said single energy bin;

providing object carrier means intermediary between said radiation generating assembly and linear array of solid state, spectroscopy grade detectors;

placing objects on said object carrier means;

arranging for said radiation generating assembly on the one hand and said object carrier means on the other hand to be displaced relative to each other at a relative velocity so adjusted that during each one of predetermined pixels commensurate with the expected smallest size of said target article, the full energy range of one of said repeating cycles impinges a full cross-section of an inspected object without any mutual dislocation between said radiation generating assembly and linear array of solid state detectors, whereby successive electrical signals are produced in said linear array of spectroscopy grade detectors;

using said electrical signals for recording for each pixel the intensity of transmitted radiation of selected energy bands;

determining for each pixel the ratios between the transmitted radiation in said selected energy bands; and processing the resulting data to produce an image of any detected target article.

7. The method of claim 6, wherein the relative displacement between the radiation generating assembly and the object carrier means is brought about by moving the object carrier means.

8. The method of claim 6, wherein the relative displacement between the radiation generating assembly and the object carrier means is brought about by moving synchronically and radiation generating assembly and linear array of solid state detectors.

9. The method of claim 6, wherein the relative displacement between the object carrier means and the radiation generating assembly is continuous.

10. The method of claim 6, wherein the relative displacement between the object carrier means and the radiation generating assembly is intermittent.

11. An apparatus for automatically detecting in sequentially inspected objects a target article made of or containing an elemental or compounded target metal of the kind capable of producing with impinging X-radiation within the range of 60–160 KeV a detectable photoelectric interaction, said apparatus comprising a radiation generating assembly comprising a 60–160 KeV X-ray source in association with collimating and filtering means capable of generating a collimated X-ray beam consisting of repeating cycles each holding several energy bins centered around the K-edge energy of said target metal;

a linear array of solid state spectroscopy grade detectors and signal counting, processing and imaging means connected therewith, which detectors are spaced from said radiation generating assembly;

object carrier means intermediary between said radiation generating means and said linear array of solid state, spectroscopy grade detectors; and means for causing the radiation generating assembly and linear array of solid state detectors on the one hand, and said object carrier means on the other hand to be displaced relative to each other at a relative velocity so adjusted that during each of a predetermined pixels commensurate with the expected smallest size of said target article, the full energy band of one of said repeating cycles impinges a full cross-section of said object carrier means without any mutual dislocation between said radiation generating means and solid state detector array.

12. The apparatus of claim 11, wherein said object carrier means is a conveyor belt.

13. The apparatus of claim 11, comprising means for synchronically, continuously or intermittently moving the radiation generating means and linear array of solid state, spectroscopy grade detectors.

14. An apparatus for automatically detecting in sequentially inspected objects a target article made of or containing an elemental or compounded target metal of the kind capable of producing with impinging X-radiation within the range of 60–160 KeV a detectable photoelectric interaction, said apparatus comprising a radiation generating assembly comprising a 60–160 KeV X-ray source in association with collimating and filtering means capable of generating a collimated X-ray beam consisting of repeating cycles each comprising one single energy bin having a flux centered around the K-edge energy of said target metal;

a linear array of solid state spectroscopy grade detectors and signal counting, processing and imaging means connected therewith, which detectors are spaced from said radiation generating assembly and are arranged in such a way that in association with said signal counting means they are capable of differentiating between simultaneous different radiation flux attenuations within predetermined energy ranges of said single energy bin;

object carrier means intermediary between said radiation generating means and said linear array of solid state, spectoscopy grade detectors; and means for causing the radiation generating assembly and linear array of solid state detectors on the one hand, and said object carrier means on the other hand, to be displaced relative to each other at a relative velocity so adjusted that during each of predetermined pixels commensurate with the expected smallest size of said target article the full energy range of one of said repeating cycles impinges a full cross-section of an inspected object without any mutual dislocation between said radiation generating means and slid stage detector array.

15. The apparatus of claim 14, wherein said object carrier means is a conveyor belt.

16. The apparatus of claim 14, comprising means for synchronically, continuously or intermittently moving the radiation generating means and linear array of solid state, spectroscopy grade detectors.

* * * * *